US008422766B2

(12) United States Patent
Zhang et al.

(10) Patent No.: US 8,422,766 B2
(45) Date of Patent: Apr. 16, 2013

(54) SYSTEM AND METHOD FOR DEPTH EXTRACTION OF IMAGES WITH MOTION COMPENSATION

(75) Inventors: Dong-Qing Zhang, Plainsboro, NJ (US); Izzat Izzat, Plainsboro, NJ (US); Youngshik Yoon, Cupertino, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 340 days.

(21) Appl. No.: 12/999,728

(22) PCT Filed: Jun. 24, 2008

(86) PCT No.: PCT/US2008/007895
§ 371 (c)(1),
(2), (4) Date: Dec. 17, 2010

(87) PCT Pub. No.: WO2009/157895
PCT Pub. Date: Dec. 30, 2009

(65) Prior Publication Data
US 2011/0110583 A1     May 12, 2011

(51) Int. Cl.
*G06K 9/00*     (2006.01)
(52) U.S. Cl.
USPC .......................................................... 382/154
(58) Field of Classification Search ........................ None
See application file for complete search history.

(56) References Cited

U.S. PATENT DOCUMENTS

| 2004/0109585 | A1* | 6/2004 | Tao et al. ...................... 382/106 |
| 2005/0031210 | A1* | 2/2005 | Shen et al. ..................... 382/215 |
| 2006/0193509 | A1* | 8/2006 | Criminisi et al. ............. 382/154 |
| 2008/0144925 | A1* | 6/2008 | Zhu et al. ...................... 382/154 |
| 2009/0022393 | A1* | 1/2009 | Bar-Zohar et al. ............. 382/154 |
| 2009/0207235 | A1* | 8/2009 | Francini et al. ................ 348/46 |

FOREIGN PATENT DOCUMENTS

| CN | 1582460 | * | 2/2005 |
| EP | 1 418 766 A | | 5/2004 |
| JP | 2004007707 | * | 1/2004 |

(Continued)

OTHER PUBLICATIONS

WO 03/036992 A (British Telecomm [GB]; Xu Li-Qun [GB]; Lei Bangjun [NL]) May 1, 2003 abstract p. 24, line 15—p. 26, line 23 figures 7,8,19.

(Continued)

*Primary Examiner* — Bhavesh Mehta
*Assistant Examiner* — David F Dunphy
(74) *Attorney, Agent, or Firm* — Robert D. Shedd; Vincent E. Duffy; James McKenzie

(57) ABSTRACT

A system and method for spatiotemporal depth extraction of images are provided. The system and method provide for acquiring a sequence of images from a scene, the sequence including a plurality of successive frames of images, estimating the disparity of at least one point in a first image with at least one corresponding point in a second image for at least one frame, estimating motion of the at least one point in the first image, estimating the disparity of the at least one next successive frame based on the estimated disparity of at least one previous frame in a forward direction of the sequence, wherein the estimate disparity is compensated with the estimated motion, and minimizing the estimated disparity of each of the plurality of successive frames based on the estimated disparity of at least one previous frame in a backward direction of the sequence.

25 Claims, 7 Drawing Sheets

FOREIGN PATENT DOCUMENTS

| | | | |
|---|---|---|---|
| JP | 2006509211 | * | 3/2006 |
| JP | 2007077942 | * | 3/2007 |
| WO | 2008073998 | * | 6/2008 |

OTHER PUBLICATIONS

Minglun Gong ED—Urfalioglu O et al: "A GPU-based Algorithm for Estimating 3D Geometry and Motion in Near Real-time" Computer and Robot Vision 2006. The 3$^{rd}$ Canadian Conference on IEEE, Piscataway NJ, USA, Jun. 7, 2006, pp. 10-10, XP010919321, ISBN: 978-0-7695-2542-6 abstract, section 2.1, figure 2.

Michael Isard et al: "Dense Motion and Disparity Estimation Via Loopy Belief Propagation" Computer Vision—ACCV 2006 Lecture Notes in Comuter Science;; LNCS, Springer, Berlin, DE, vol. 3852, Jan. 1, 2005, pp. 32-41, XP019027463 ISBN: 978-3-540-31244-4, abstract, Sections 2 and 3 Search Report dtd Mar. 30, 2009.

* cited by examiner (a) Forward Motion Field (b) Forward warping (c) Backward Warping

US 8,422,766 B2

SYSTEM AND METHOD FOR DEPTH EXTRACTION OF IMAGES WITH MOTION COMPENSATION

This application claims the benefit under 35 U.S.C. §365 of International Application PCT/US2008/007895, filed Jun. 24, 2008, which was published in Accordance with PCT article 21 (2) on Dec. 30, 2009.

TECHNICAL FIELD OF THE INVENTION

The present disclosure generally relates to computer graphics processing and display systems, and more particularly, to a system and method for depth extraction of images with forward and backward depth prediction.

BACKGROUND OF THE INVENTION

Stereoscopic imaging is the process of visually combining at least two images of a scene, taken from slightly different viewpoints, to produce the illusion of three-dimensional depth. This technique relies on the fact that human eyes are spaced some distance apart and do not, therefore, view exactly the same scene. By providing each eye with an image from a different perspective, the viewer's eyes are tricked into perceiving depth. Typically, where two distinct perspectives are provided, the component images are referred to as the "left" and "right" images, also know as a reference image and complementary image, respectively. However, those skilled in the art will recognize that more than two viewpoints may be combined to form a stereoscopic image.

In three-dimensional (3D) post-production, visual effects (VFX) workflow and 3D display applications, an important process is to infer a depth map from stereoscopic images consisting of left eye view and right eye view images. For instance, recently commercialized autostereoscopic 3D displays require an image plus depth map input format, so that the display can generate different 3D views to support multiple viewing angles.

The process of inferring the depth map from a stereo image pair is called stereo matching in the field of computer vision research since pixel or block matching is used to find the corresponding points in the left eye and right eye view images. More recently, the process of inferring a depth map is also known as depth extraction in the 3D display community. Depth values are inferred from the relative distance between two pixels in the images that correspond to the same point in the scene.

Stereo matching of digital images is widely used in many computer vision applications (such as, for example, fast object modeling and prototyping for computer-aided drafting (CAD), object segmentation and detection for human-computer interaction (HCI), video compression, and visual surveillance) to provide 3D depth information. Stereo matching obtains images of a scene from two or more cameras positioned at different locations and orientations in the scene. These digital images are obtained from each camera at approximately the same time and points and each of the images are matched corresponding to a 3D point in space. In general, points from different images are matched by searching a portion of the images and using constraints (such as an epipolar constraint) to correlate a point in one image to a point in another image.

There has been substantial work done on depth map extraction. Most of the prior work on depth extraction focuses on single stereoscopic image pairs rather videos. However, videos instead of images are the dominant media in the consumer electronics world. For videos, a sequence of stereoscopic image pairs are employed rather than single image pairs. In conventional technology, a static depth extraction algorithm is applied to each frame pair. In most cases, the qualities of the output depth maps are sufficient for 3D playback. However, for frames with a large amount of texture, temporal jittering artifacts can be seen because the depth maps are not exactly aligned in the time direction, i.e., over a period of time for a sequence of image pairs. Conventional systems have proposed to stabilize the depth map extraction process along the time direction by enforcing smoothness constraints over the sequence of images. However, if there is large motion of the scene, motion of objects has to be taken into account in order to accurately predict the depth maps along the time direction.

Therefore, a need exists for techniques to stabilize the depth map extraction process along the time direction to reduce the temporal jittering artifacts. A further need exists for techniques for depth map extraction that takes into consideration object motion over time or over a sequence of images.

SUMMARY

A system and method for spatiotemporal depth extraction of images with forward and backward depth prediction are provided. The system and method of the present disclosure stabilizes the depth map extraction process along the time direction while taking into consideration object motion resulting in highly accurate depth maps.

According to one aspect of the present disclosure, a method of stereo matching at least two images is provided. The method including acquiring a sequence of a first image and a second image from a scene, the sequence including a plurality of successive frames of the first and second images, estimating the disparity of at least one point in the first image with at least one corresponding point in the second image for at least one frame, estimating motion of the at least one point in the first image from the at least one frame to at least one next successive frame, estimating the disparity of the at least one next successive frame based on the estimated disparity of at least one previous frame in a first direction of the sequence, wherein the estimate disparity of the at least one next successive frame is compensated with the estimated motion, and minimizing the estimated disparity of each of the plurality of successive frames based on the estimated disparity of at least one previous frame in a second direction of the sequence. The first image includes a left eye view image and the second image includes a right eye view image of a stereoscopic pair.

According to another aspect of the present disclosure, a system for stereo matching at least two images is provided. The system includes means for acquiring a first image and a second image from a scene, the sequence including a plurality of successive frames of the first and second images, a motion compensator for estimating motion of at least one point in the first image from at least one frame to at least one successive frame, and a disparity estimator configured for estimating the disparity of the at least one point in the first image with at least one corresponding point in the second image for at least one frame, estimating the disparity of the at least one next successive frame based on the estimated disparity of at least one previous frame in a first direction of the sequence, wherein the estimated disparity of the at least one next successive frame is compensated with the estimated motion, and minimizing the estimated disparity of each of the plurality of successive frames based on the estimated disparity of at least one previous frame in a second direction of the sequence.

According to a further aspect of the present disclosure, a program storage device readable by a machine, tangibly embodying a program of instructions executable by the machine to perform method steps for stereo matching at least two images is provided, the method including acquiring a sequence of a first image and a second image from a scene, the sequence including a plurality of successive frames of the first and second images, estimating the disparity of at least one point in the first image with at least one corresponding point in the second image for at least one frame), estimating motion of the at least one point in the first image from the at least one frame to at least one next successive frame, estimating the disparity of the at least one next successive frame based on the estimated disparity of at least one previous frame in a first direction of the sequence, wherein the estimate disparity of the at least one next successive frame is compensated with the estimated motion, and minimizing the estimated disparity of each of the plurality of successive frames based on the estimated disparity of at least one previous frame in a second direction of the sequence.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
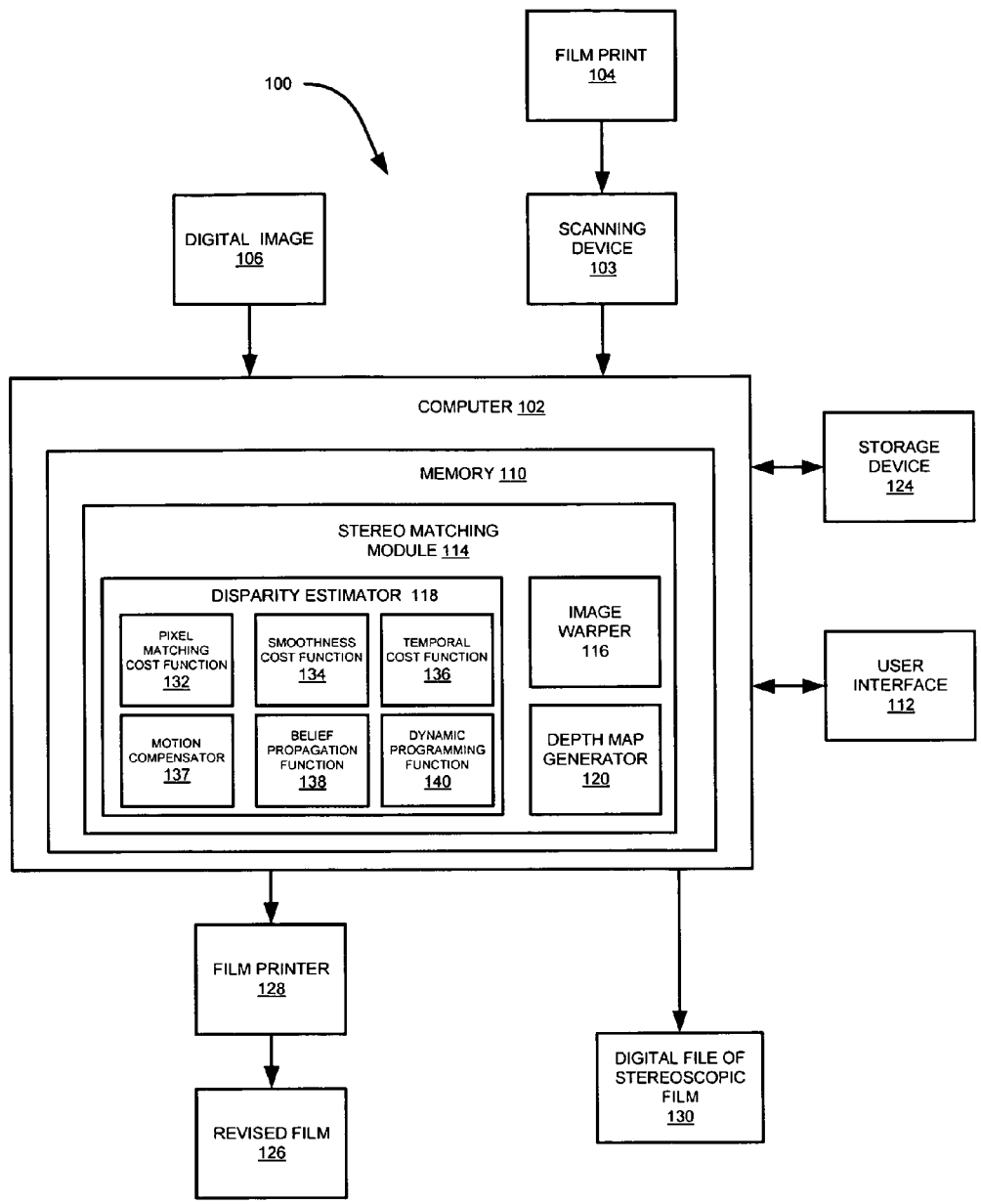
FIG. 1 is an exemplary illustration of a system for stereo matching at least two images according to an aspect of the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Stereo matching is a standard methodology for inferring a depth map from stereoscopic images, e.g., a left eye view image and right eye view image. 3D playback on conventional autostereoscopic displays has shown that the smoothness of the depth map significantly affects the look of the resulting 3D playback. Non-smooth depth maps often result in zig-zaging edges in 3D playback, which are visually worse than the playback of a smooth depth map with less accurate depth values. Therefore, the smoothness of depth map is more important than the depth accuracy for 3D display and playback applications. Furthermore, global optimization based approaches are necessary for depth estimation in 3D display applications. This disclosure presents a depth extraction technique that incorporates temporal information to improve the smoothness of the depth map. Many stereo techniques optimize a cost function that enforce spatial coherence and consistency with the data. For image sequences, a temporal component is important to improve the accuracy of the extracted depth map. Furthermore, if there is large motion of objects in a scene or sequence of images, the object motion is to be taken into account to accurately predict depth maps along the time direction.

A system and method for spatiotemporal depth extraction of images with motion compensation are provided. The system and method of the present disclosure provide a depth extraction technique that incorporates temporal information to improve the smoothness of the depth map. The techniques of the present disclosure incorporate a forward and backward pass, where a previous depth map of a frame of an image sequence is used to initialize or predict the depth extraction at a current frame, which makes the computation faster and more accurate. The system and method further employs object motion compensation for increasing the accuracy of the depth prediction. The depth map or disparity map can then be utilized with a stereoscopic image pair for 3D playback. The techniques of the present disclosure are effective in solving the problem of temporal jittering artifacts of 3D playback in 2D+Depth display caused by the instability of depth maps.

Referring now to the Figures, exemplary system components 100 according to an embodiment of the present disclosure are shown in FIG. 1. A scanning device 103 may be provided for scanning film prints 104, e.g., camera-original film negatives, into a digital format, e.g. Cineon-format or Society of Motion Picture and Television Engineers ("SMPTE") Digital Picture Exchange ("DPX") files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing device 102. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printing a revised version of the film 126, e.g., a stereoscopic version of the film, wherein a scene or a plurality of scenes may have been altered or replaced using 3D modeled objects as a result of the techniques described below.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes a stereo matching module 114 stored in the memory 110 for matching at least one point in a first image with at least one corresponding point in a second image. The stereo matching module 114 further includes an image warper 116 configured to adjust the epipolar lines of the stereoscopic image pair so that the epipolar lines are exactly the horizontal scanlines of the images.

The stereo matching module 114 further includes a disparity estimator 118 configured for estimating the disparity of the at least one point in the first image with the at least one corresponding point in the second image and for generating a disparity map from the estimated disparity for each of the at least one point in the first image with the at least one corresponding point in the second image. The disparity estimator 118 includes a pixel matching cost function 132 configured to match pixels in the first and second images, a smoothness cost function 134 to apply a smoothness constraint to the disparity estimation and a temporal cost function 136 configured to align a sequence of generated disparity maps over time. A motion compensator 137 is provided which employs a motion field algorithm or function for matching a block in an image over a sequence of images. The disparity estimator 118 further includes a belief propagation algorithm or function 138 for minimizing the estimated disparity and a dynamic programming algorithm or function 140 to initialize the belief propagation function 138 with a result of a deterministic matching function applied to the first and second image to speed up the belief propagation function 138.

The stereo matching module 114 further includes a depth map generator 120 for converting the disparity map into a depth map by inverting the disparity values of the disparity map.

Figure 2:
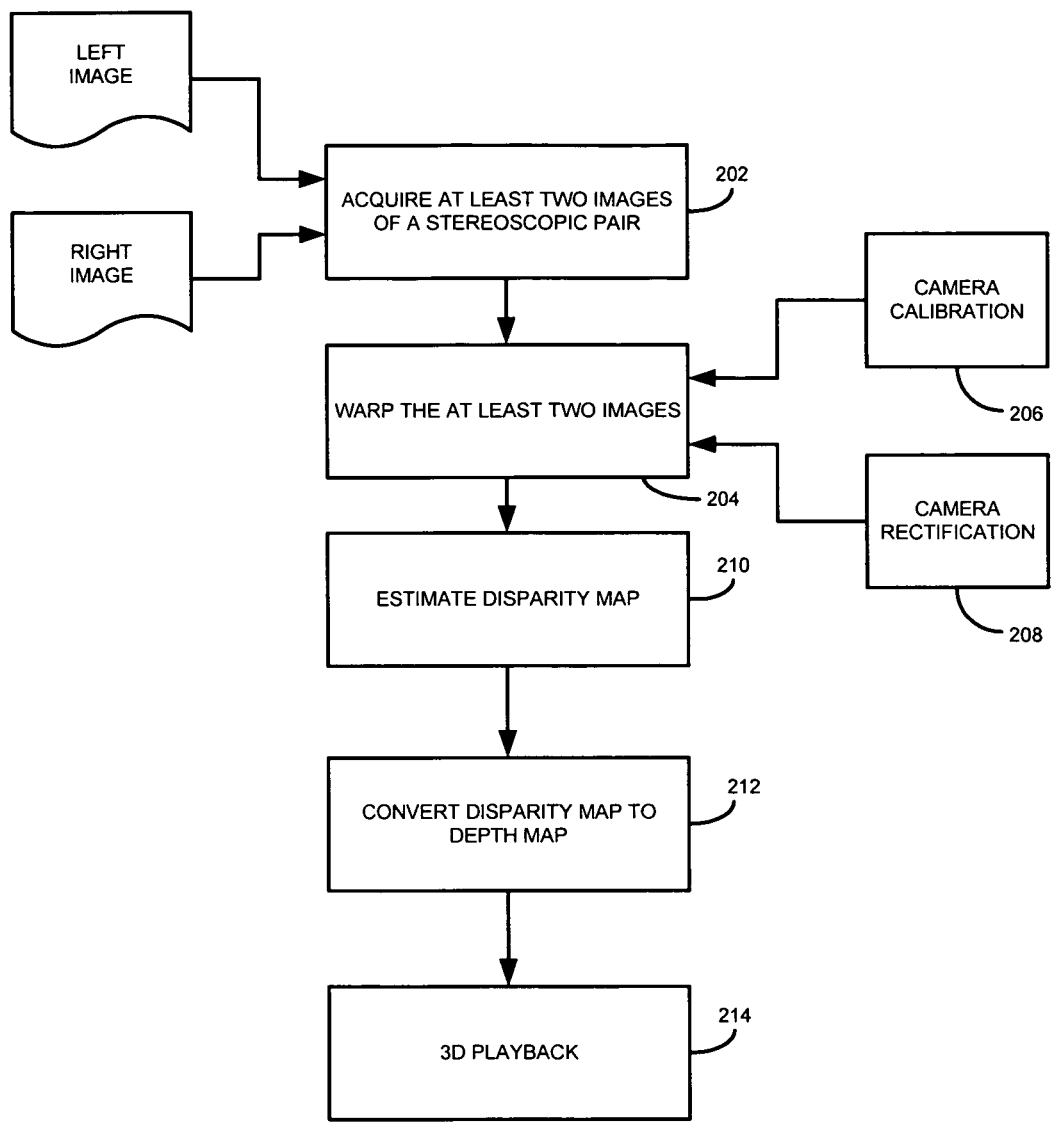
FIG. 2 is a flow diagram of an exemplary method for stereo matching at least two images according to an aspect of the present disclosure.

FIG. 2 is a flow diagram of an exemplary method for stereo matching of at least two two-dimensional (2D) images according to an aspect of the present disclosure. Initially, at step 202, the post-processing device 102 acquires at least two 2D images, e.g., a stereo image pair with left and right eye views. The post-processing device 102 may acquire the at least two 2D images by obtaining the digital master image file in a computer-readable format. The digital video file may be acquired by capturing a temporal sequence of moving images with a digital camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital image file will include one image, e.g., $I_1$, $I_2$, ... $I_n$.

Figure 3:
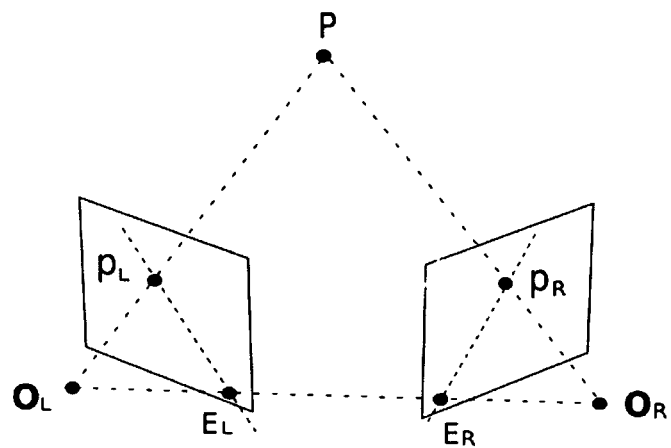
FIG. 3 illustrates the epipolar geometry between two images taken of a point of interest in a scene.

Stereoscopic images can be taken by two cameras with the same settings. Either the cameras are calibrated to have the same focal length, focal height and parallel focal plane; or the images have to be warped based on known camera parameters as if they were taken by the cameras with parallel focal planes (step 204). This warping process includes camera calibration (step 206) and camera rectification (step 208). The calibration and rectification process adjust the epipolar lines of the stereoscopic images so that the epipolar lines are exactly the horizontal scanlines of the images. Referring to FIG. 3, $O_L$ and $O_R$ represent the focal points of two cameras, P represents the point of interest in both cameras and $p_L$ and $p_R$ represent where point P is projected onto the image plane. The point of intersection on each focal plane is called the epipole (denoted by $E_L$ and $E_R$). Right epipolar lines, e.g., $E_R$-$p_R$, are the projections on the right image of the rays connecting the focal center and the points on the left image, so the corresponding point on the right image to a pixel on the left image should be located at the epipolar line on the right image, likewise for the left epipolar lines, e.g., $E_L$-$p_L$. Since corresponding point finding happens along the epipolar lines, the rectification process simplifies the correspondence search to searching only along the scanlines, which greatly reduces the computational cost. Corresponding points are pixels in images that correspond to the same scene point.

Figure 4:
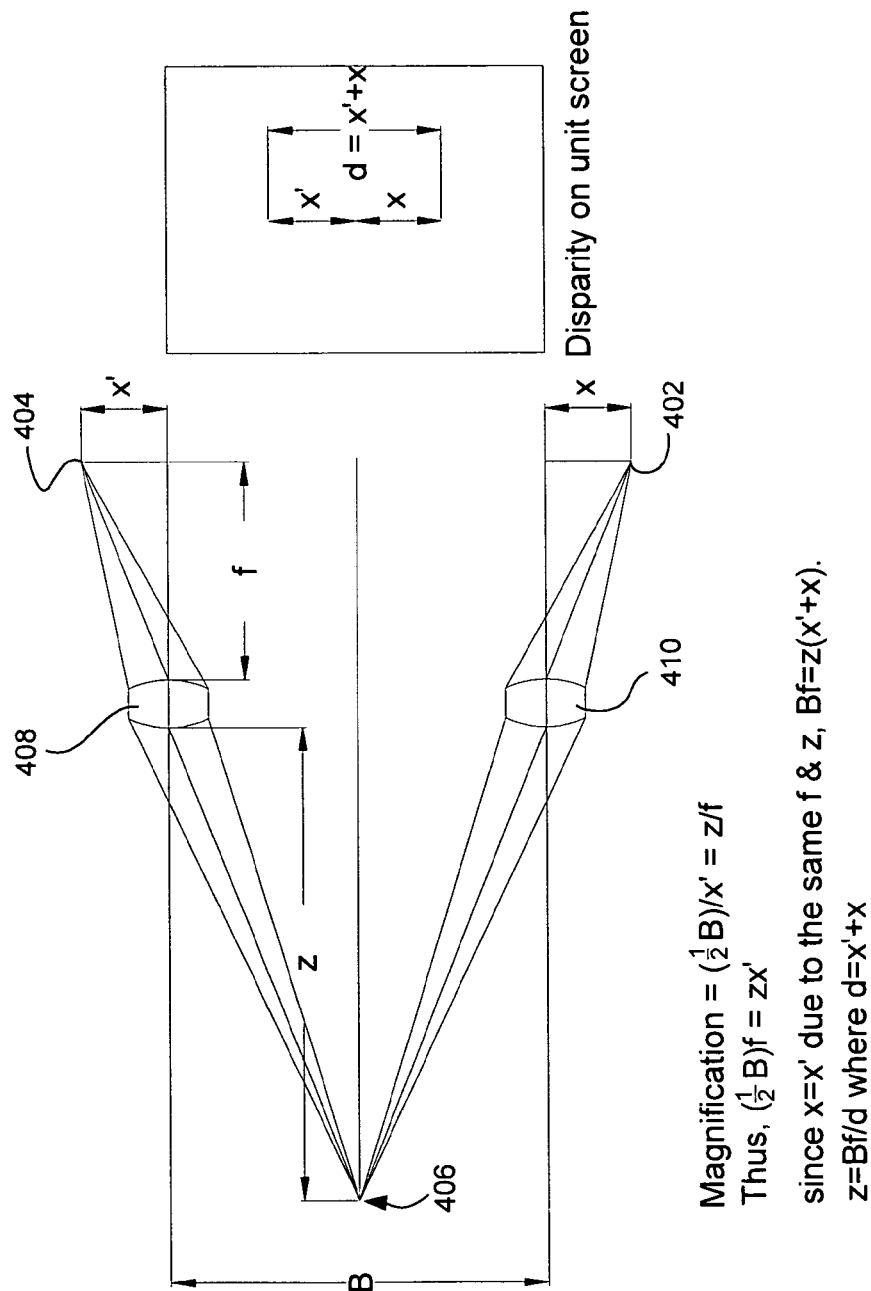
FIG. 4 illustrates the relationship between disparity and depth.

Referring again to FIG. 2, at step 210 the disparity map is estimated for every point in the scene. Once the corresponding points are found, the disparity for every scene point is calculated as the relative distance of the matched points in the left and right eye images. For example, referring to FIG. 4 in conjunction with FIG. 2, if the horizontal coordinate of a point in the left eye image 402 is x, and the horizontal coordinate of its corresponding point in the right eye image 404 is x', then the disparity d=x'−x. Then, in step 212, the disparity value d for a scene point 406 is converted into depth value z, the distance from the scene point 406 (also known as the convergence point) to the camera 408, 410, using the following formula: z=Bf/d, where B is the distance between the two cameras 408, 410, also called baseline, and f is the focal length of the camera, the proof of which is shown in FIG. 4.

Figure 5:
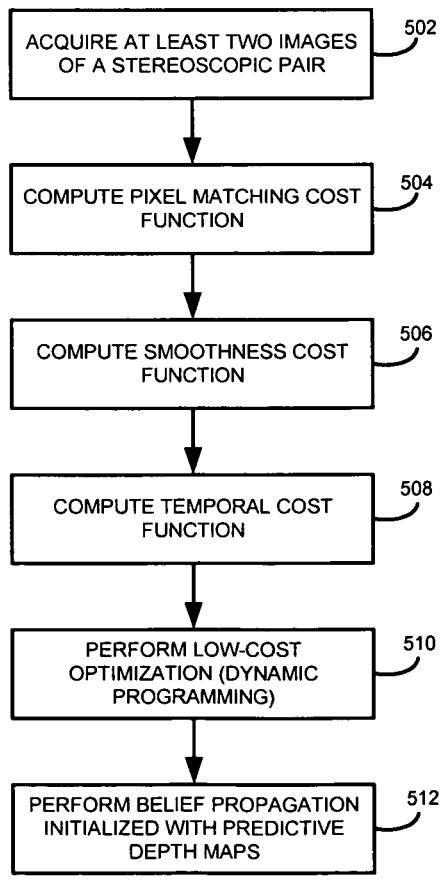
FIG. 5 is a flow diagram of an exemplary method for estimating disparity of at least two images according to an aspect of the present disclosure.

With reference to FIG. 5, a method for estimating a disparity map, identified above as step 210, in accordance with the present disclosure is provided. Initially, a stereoscopic pair of images is acquired (step 502). A disparity cost function is computed including computing a pixel cost function (step 504), computing a smoothness cost function (step 506) and computing a temporal cost function (step 508). A low-cost stereo matching optimization, e.g., dynamic programming, is performed to get initial deterministic results of stereo matching the two images (step 510). The results of the low-cost optimization are then used to initialize a belief propagation function to speed up the belief propagation function for minimizing the disparity cost function for the first frame of a sequence (512). Predictive depth maps will then be used to initialize the belief propagation function for the subsequent frames of the sequence.

The disparity estimation and formulation thereof shown in FIG. 5 will now be described in more detail. Disparity estimation is the most important step in the workflow described above. The problem consists of matching the pixels in left eye image and the right eye image, i.e., find the pixels in the right and left images that correspond to the same scene point. By considering that the disparity map is smooth, the stereo matching problem can be formulated mathematically as follows:

$$C(d(.)) = C_p(d(.)) + \lambda C_s(d(.)) \quad (1)$$

where d(.) is the disparity field, d(x,y) gives the disparity value of the point in the left eye image with coordinate (x,y), C is the overall cost function, $C_p$ is the pixel matching cost function, and $C_s$ is the smoothness cost function. The smoothness cost function is a function used to enforce the smoothness of the disparity map. During the optimization process, the above cost functional is minimized with respect to all disparity fields. For local optimization, the smoothness term $C_s$ is discarded; therefore, smoothness is not taken into account during the optimization process. $C_p$ can be modeled, among other forms, as the mean square difference of the pixel intensities:

$$C_p(d(.)) = \sum_{x,y} [I(x,y) - I'(x - d(x,y), y)]^2. \quad (2)$$

The smoothness constraint can be written differently depending on whether vertical smoothness is enforced or not. If both horizontal and vertical smoothness constraints are enforced, then, the smoothness cost function can be modeled as the following mean square error function:

$$C_s(d(.)) = \sum_{x,y} [d(x,y) - d(x+1,y)]^2 + [d(x,y) - d(x,y+1)]^2 \quad (3)$$

Figure 6:
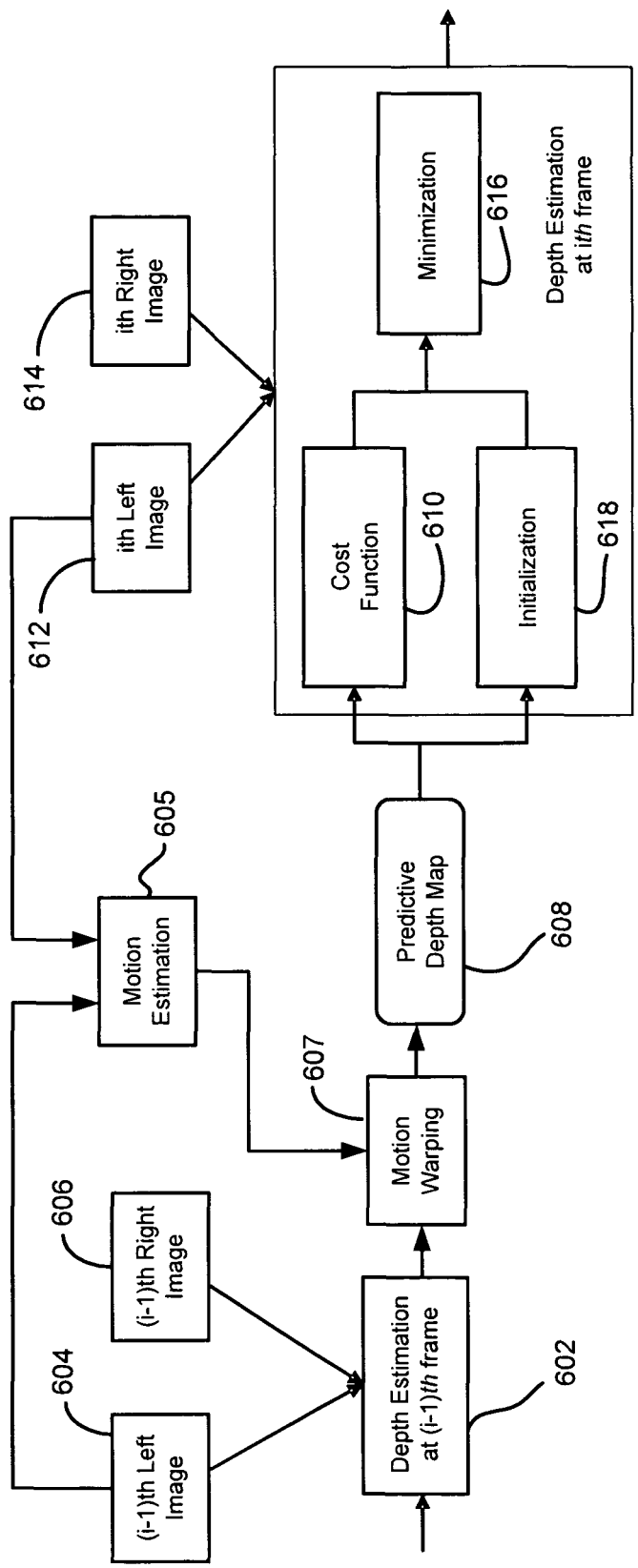
FIG. 6 is a flow diagram of an exemplary method of depth extraction with object motion compensation according to an aspect of the present disclosure.

Next, the temporal constraints are taken into account in the cost function as illustrated in FIG. 6. The previous depth map at (i−1)th frame is used to predict the current depth map at the ith frame, so that the estimation of the current depth map can be constrained by the previous depth map. In step 602, assume a depth map estimated at the (i−1)th frame from the (i−1)th left image 604 and the (i−1) right image 606 is represented as $d_{i-1}(.)$. Predictive depth map $d^+(.)$ is used to predict the depth map at ith frame. The predictive depth map $d^+(.)$ is calculated by interpolating the depth map at (i−1)th frame to ith frame, in step 608. In one embodiment, a simple interpolation process is used, where the predictive depth map is equal to the depth map at (i−1)th frame, i.e. $d^+(.)=d_{i-1}(.)$, without considering motion information. Taking into account the predictive depth map, a temporal prediction term in the overall depth cost function can be constructed as the following:

$$C_t(d(.)) = \sum_{x,y} [d(x,y) - d^+(x,y)]^2 \quad (4)$$

In step 610, the cost function is calculated for the current frame from the two input images, i.e., the ith left image 612 and the ith right image 614. The cost function will be minimized to get the final depth map result, in step 616. In step 618, the predictive depth map (determined in step 608) is used to initialize the minimization process (minimization block 616) so as to speed up the computation (as shown in Eq.4).

Therefore, the overall cost function becomes $$C(d(.)) = C_p(d(.)) + \lambda C_s(d(.)) + \mu C_t(d(.)) \quad (5)$$

where μ is a weighting factor to weight the temporal predictive cost function in the overall cost function. μ can be determined empirically.

The main problem of the prediction process described above is that the prediction would be inaccurate if there is large motion. Therefore, the system and method of the present disclosure provides a way to compensate for the object motion during prediction, as will be described below.

Figure 8:
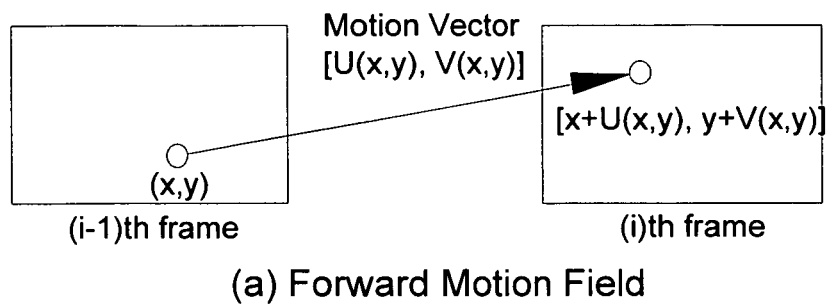
FIG. 8 illustrates forward and backward warping using a forward motion field according to an aspect of the present disclosure.
Figure 8:
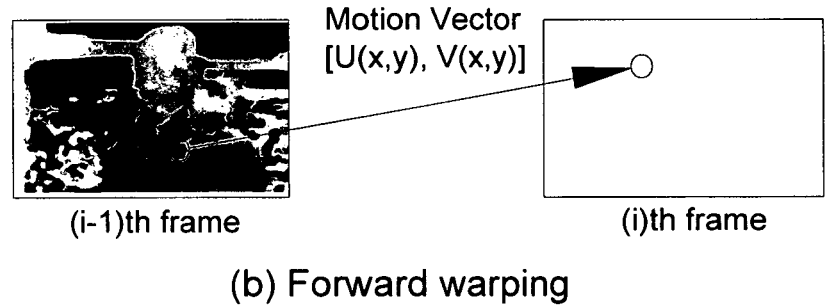
Figure 8:
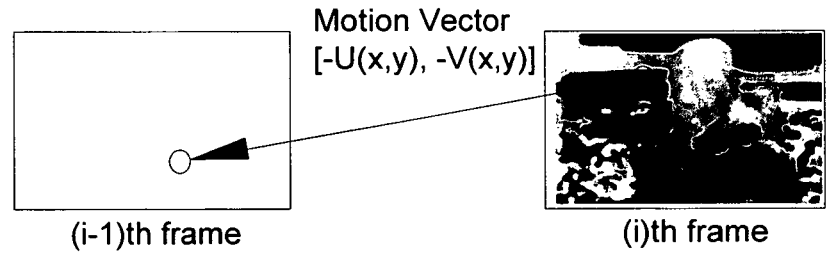

In step 605, a motion algorithm or function is employed to estimate the motion field between consecutive frames (e.g., the (i−1)th left image 604 and the ith left image 612) in the left-eye sequence. Such motion field can be represented as to scalar field U(x,y), and V(x,y) corresponding to horizontal and vertical components of the motion respectively, where x and y are the coordinates of the pixels, as shown in FIG. 8(a). For example, if U(2,3)=10, and V(2,3)=6, the pixel at coordinate (2,3) in the (i−1)th left-eye image moves 10 pixels horizontally, and 6 pixels vertically in the (i)th frame.

Given the motion field U(x,y), and V(x,y), and assuming a depth map is estimated at the (i−1)th frame as $d_{i-1}(.)$, then motion compensated predictive depth map (determined in step 608) can be represented as $$d_M^+(.) = \text{Warp}(d_{i-1}(.), U(.), V(.)) \tag{6}$$

where Warp(.) is a warping algorithm or function that distorts (or morphs) the previous depth map using motion vector fields that is applied to the (i−1)th depth map at step 607. The way of distorting the depth map depends on the direction of prediction, which will be described below.

So by taking into account motion of objects, a temporal prediction term can be constructed in the overall depth cost function as the following:

$$C_t(d(.)) = \sum_{x,y} [d(x,y) - d_M^+(x,y)]^2 \tag{7}$$

where $d_M^+(.)$ is the motion-compensated predictive depth map.

The drawback of the method described above is that when there is error at the first frame of the sequence, the error would be propagated to the rest of the frames until the end of the sequence. Furthermore, in experiments, it has been observed that the depth map at the last frame in the sequence is much smoother than the first depth map in the sequence. That is because the smoothing effect is accumulated along the frames during the optimization with temporal constraints.

Figure 7:
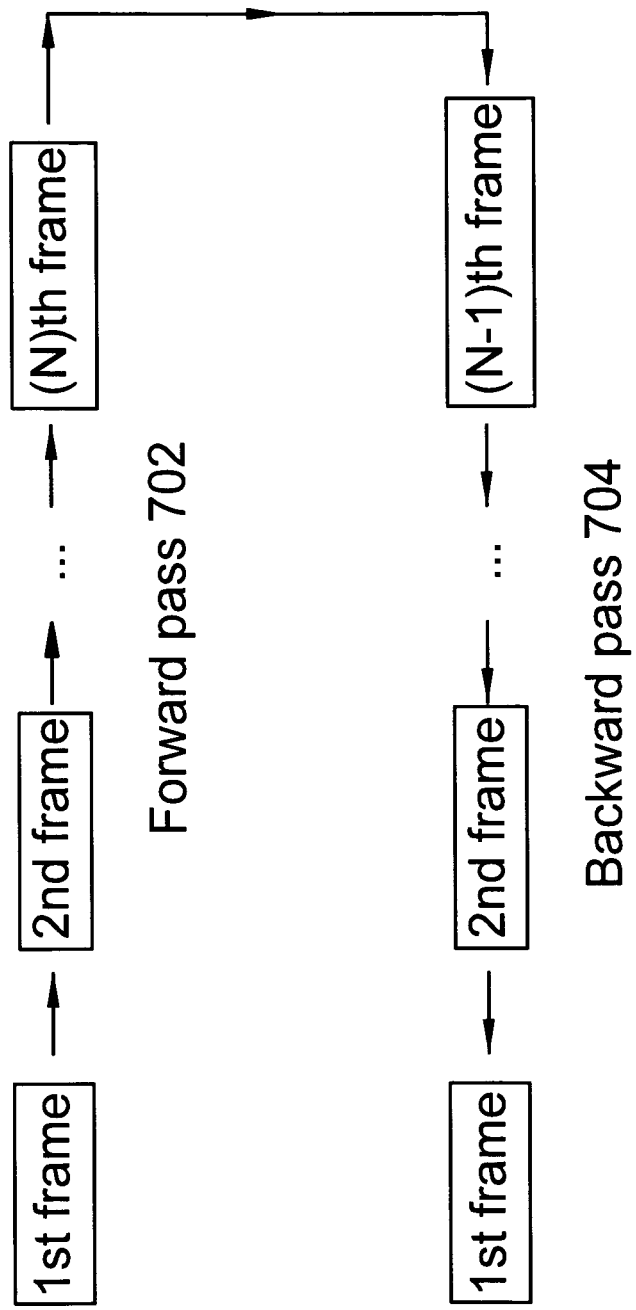
FIG. 7 illustrates a forward and backward prediction process for enhancing depth maps a sequence of successive frames of stereoscopic images.

To solve the above the described problem, a multi-pass forward and backward process is provided as illustrated in FIG. 7. The forward and backward process first performs a first pass 702 with the temporal prediction with forward direction, i.e. from the first frame in the sequence to the last frame, i.e., (N)th frame. In the next pass 704, the temporal prediction starts from the last frame, and goes backward until the first frame, e.g., (N−1)th frame, (N−2)th frame, (N−3)th frame . . . $1^{st}$ frame. The same procedure can be repeated to have multiple passes of forward and backward prediction.

In the forward and backward process without motion compensation, for the forward pass 702 the predictive depth map is set as $d^+(.) = d_{i-1}(.)$, and for the backward pass 704 the predictive depth map is set as $d^+ = d_{i+1}(.)$. Taking into account motion compensation, for the forward pass 702 the predictive depth map is set as $$d_M^+(.) = \text{Warp}_f(d_{i-1}(.), U_{i-1}(.), V_{i-1}(.)) \tag{8}$$

where $\text{Warp}_f(.)$ is a forward warping operator. Forward warping of the image I is defined as the following (as shown in FIG. 8(b))

$$I(x,y) = I_w(x + U(x,y), y + V(x,y)), \tag{9}$$

for each (x,y) on the image plane of I. Namely, under forward warping, the pixels in the image I are transported to $I_w$ using the motion vector field U(.) and V(.), where the reference image is I.

Likewise, for the backward prediction 704 pass, the predictive depth map is set as $$d_M^+(.) = \text{Warp}_b(d_{i+1}(.), U_i(.), V_i(.)) \tag{10}$$

where $\text{Warp}_b(.)$ is a backward warping operator. By using backwarping, the warped image is defined as the following (as shown in FIG. 8(c))

$$I_w(x,y) = I(x - U(x,y), y - V(x,y)) \tag{11}$$

for each (x,y) on the image plane of $I_w$. Namely, under backward warping, the pixels in the image/are transported back to $I_w$ using the motion field U(.) and V(.) where the reference image is $I_w$. The reason there is a difference between forward and backward warping is that the motion vector field U(.) and V(.) is always forward. Namely, the motion vector (U(x,y), V(x,y)) always starts from (i−1)th image and ends at ith image (as shown in FIG. 8(a)).

The overall cost function, shown in Eq. 5, can be minimized using different methods to get the estimated depth map. In one embodiment, a belief propagation function is used to minimize the cost function of Eq. 5. Belief propagation is high quality optimization algorithm used in computer vision and machine learning. To speed up the belief propagation function or algorithm, a low-cost optimization algorithm, e.g., a dynamic programming function, is used to first get a low-quality depth map. Then, this low-quality depth map is used to initialize the belief propagation function or algorithm.

In a further embodiment, instead of using a low-quality depth map to initialize the belief propagation function, the motion-compensated predictive depth map $d_M^+(.)$ can be employed to initialize the belief propagation function. Namely, during forward prediction, when the depth map $d_i(.)$ is estimated, the motion-compensated depth map of $d_{i-1}(.)$ is employed to initialize the belief propagation function. Likewise, during backward prediction, when the depth map $d_i(.)$ is estimated, the motion-compensated depth map of $d_{i+1}(.)$ is employed to initialize the belief propagation function. In this embodiment, for a sequence of images, the low-quality depth initialization is only used for the $1^{st}$ image frame in the sequence. For the rest of the frames in the sequence, the predictive depth maps are used to initialize the belief propagation function or algorithm.

Referring back to FIG. 2, in step 212, the disparity value d for each scene point is converted into depth value z, the distance from the scene point to the camera, using the following formula: z=Bf/d, where B is the distance between the two cameras, also called baseline, and f is the focal length of the camera. The depth values for each at least one image, e.g., the left eye view image, are stored in a depth map. The corresponding image and associated depth map are stored, e.g., in storage device 124, and may be retrieved for 3D playback (step 214). Furthermore, all images of a motion picture or video clip can be stored with the associated depth maps in a single digital file 130 representing a stereoscopic version of the motion picture or clip. The digital file 130 may be stored in storage device 124 for later retrieval, e.g., to print a stereoscopic version of the original film.

Although embodiments which incorporate the teachings of the present disclosure have been shown and described in detail herein, those skilled in the art can readily devise many other varied embodiments that still incorporate these teachings. Having described preferred embodiments for a system and method for spatiotemporal depth extraction of images with forward and backward depth prediction and motion compensation (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method of stereo matching at least two images, the method comprising:
   acquiring of a first image and a second image from a scene, the sequence including a plurality of successive frames of the first and second images;
   estimating the disparity of at least one point in the first image with at least one corresponding point in the second image for at least one frame;
   estimating motion of the at least one point in the first image from the at least one frame to at least one next successive frame;
   estimating the disparity of the at least one next successive frame based on the estimated disparity of at least one previous frame in a first direction of the sequence, wherein the estimate disparity of the at least one next successive frame is compensated with the estimated motion; and
   minimizing the estimated disparity of each of the plurality of successive frames based on the estimated disparity of at least one previous frame in a second direction of the sequence.

2. The method as in claim 1, wherein the first image includes a left eye view image and the second image includes a right eye view image of a stereoscopic pair.

3. The method as in claim 2, wherein the estimating the disparity of at least one next successive frame includes computing a temporal cost function.

4. The method as in claim 3, wherein the computing a temporal cost function further comprises:
   predicting the disparity for a current frame from the estimated disparity of at least one previous frame;
   estimating the disparity of the current frame from a first image and second image of the current frame; and
   minimizing the estimated disparity of the current frame, wherein the minimizing step is initialized with the predicted disparity for the current frame.

5. The method as in claim 4, wherein the predicting the disparity for the current frame further comprises:
   estimating a motion field from the at least one previous frame to the current frame and
   warping the estimated disparity of the at least one previous frame with the estimated motion field.

6. The method as in claim 5, wherein the minimizing the estimated disparity in the second direction of the sequence further comprises:
   warping the estimated disparity of the current frame to at least one previous frame with the estimated motion field.

7. The method as in claim 3, wherein the estimating the disparity step includes computing a pixel matching cost function.

8. The method as in claim 3, wherein the estimating the disparity step includes computing a smoothness cost function.

9. The method as in claim 1, further comprising minimizing the estimated disparity for the at least one frame using a belief propagation function, wherein the belief propagation function is initialized with an estimated disparity of the at least one frame determined by a low-cost optimization function.

10. The method as in claim 9, further comprising minimizing the estimated disparity of the at least one successive frame using a belief propagation function, wherein the belief propagation function is initialized with the motion-compensated estimated disparity of the at least one previous frame.

11. A system for stereo matching at least two images comprising:
    means for acquiring a first image and a second image from a scene, the sequence including a plurality of successive frames of the first and second images;
    a motion compensator for estimating motion of at least one point in the first image from at least one frame to at least one successive frame; and
    a disparity estimator configured for estimating the disparity of the at least one point in the first image with at least one corresponding point in the second image for at least one frame, estimating the disparity of the at least one next successive frame based on the estimated disparity of at least one previous frame in a first direction of the sequence, wherein the estimated disparity of the at least one next successive frame is compensated with the estimated motion, and minimizing the estimated disparity of each of the plurality of successive frames based on the estimated disparity of at least one previous frame in a second direction of the sequence.

12. The system as in claim 11, wherein the first image includes a left eye view image and the second image includes a right eye view image of a stereoscopic pair.

13. The system as in claim 11, wherein disparity estimator includes a temporal cost function.

14. The system as in claim 13, wherein the disparity estimator includes a pixel matching cost function.

15. The system as in claim 13, wherein the disparity estimator includes a smoothness cost function.

16. The system as in claim 11, wherein disparity estimator is further configured to minimize the estimated disparity for the at least one frame using a belief propagation function, wherein the belief propagation function is initialized with an estimated disparity of the at least one frame determined by a low-cost optimization function.

17. The system as in claim 16, wherein disparity estimator is further configured to predict the disparity for a current frame from the estimated disparity of at least one previous frame, estimate the disparity of the current frame from a first image and second image of the current frame and minimize the estimated disparity of the current frame, wherein the minimizing step is initialized with the predicted disparity for the current frame.

18. The system as in claim 17, wherein the motion compensator is further configured to estimate a motion field from the at least one previous frame to the current frame and the disparity estimator is further configured to warp the estimated disparity of the at least one previous frame with the estimated motion field.

19. The system as in claim 18, wherein the disparity estimator is further configured to minimize the estimated disparity in the second direction of the sequence by warping the estimated disparity of the current frame to at least one previous frame with the estimated motion field.

20. The system as in claim 16, wherein disparity estimator is further configured to minimize the estimated disparity of the at least one successive frame using a belief propagation function , wherein the belief propagation function is initialized with the motion-compensated estimated disparity of the at least one previous frame.

21. A non-transitory program storage device readable by a machine, tangibly embodying a program of instructions executable by the machine to perform method steps for stereo matching at least two images, the method comprising:
    acquiring a sequence of a first image and a second image from a scene, the sequence including a plurality of successive frames of the first and second images;

estimating the disparity of at least one point in the first image with at least one corresponding point in the second image for at least one frame;

estimating motion of the at least one point in the first image from the at least one frame to at least one next successive frame;

estimating the disparity of the at least one next successive frame based on the estimated disparity of at least one previous frame in a first direction of the sequence wherein the estimate disparity of the at least one next successive frame is compensated with the estimated motion; and minimizing the estimated disparity of each of the plurality of successive frames based on the estimated disparity of at least one previous frame in a second direction of the sequence.

22. The program storage device as in claim 21, wherein the estimating the disparity of at least one next successive frame includes computing a temporal cost function.

23. The program storage device as in claim 22, wherein the computing a temporal cost function further comprises:

predicting the disparity for a current frame from the estimated disparity of at least one previous frame;

estimating the disparity of the current frame from a first image and second image of the current frame; and minimizing the estimated disparity of the current frame, wherein the minimizing step is initialized with the predicted disparity for the current frame.

24. The program storage device as in claim 23, wherein the predicting the disparity for the current frame further comprises:

estimating a motion field from the at least one previous frame to the current frame; and warping the estimated disparity of the at least one previous frame with the estimated motion field.

25. The program storage device as in claim 24, wherein the minimizing the estimated disparity in the second direction of the sequence further comprises:

warping the estimated disparity of the current frame to at least one previous frame with the estimated motion field.

* * * * *